United States Patent
Tsukada

(10) Patent No.: US 10,005,895 B2
(45) Date of Patent: Jun. 26, 2018

(54) CROSS-LINKED RUBBER PRODUCT

(71) Applicant: ZEON CORPORATION, Tokyo (JP)

(72) Inventor: Akira Tsukada, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days. days.

(21) Appl. No.: 15/546,616

(22) PCT Filed: Feb. 10, 2016

(86) PCT No.: PCT/JP2016/053885
§ 371 (c)(1),
(2) Date: Jul. 26, 2017

(87) PCT Pub. No.: WO2016/132978
PCT Pub. Date: Aug. 25, 2016

(65) Prior Publication Data
US 2018/0016423 A1   Jan. 18, 2018

(30) Foreign Application Priority Data
Feb. 16, 2015   (JP) .................................. 2015-027161

(51) Int. Cl.
| | |
|---|---|
| *C08L 9/02* | (2006.01) |
| *C08L 15/00* | (2006.01) |
| *C08K 5/11* | (2006.01) |
| *C08K 5/053* | (2006.01) |
| *C08F 8/04* | (2006.01) |

(52) U.S. Cl.
CPC .............. *C08L 9/02* (2013.01); *C08L 2205/03* (2013.01)

(58) Field of Classification Search
CPC ...... C08L 9/02; C08L 15/005; C08L 2205/14; C08L 2312/00
USPC ................................................... 524/521, 566
See application file for complete search history.

(56) References Cited

U.S. PATENT DOCUMENTS

2014/0220279 A1* 8/2014 Tsukada ................... C08L 9/02
428/36.6

FOREIGN PATENT DOCUMENTS

| | | | | |
|---|---|---|---|---|
| EP | 2 548 919 A1 | 1/2013 | | |
| JP | 2004099753 A | * 4/2004 | ............... | C08L 9/15 |
| WO | 2011/115093 A1 | 9/2011 | | |

OTHER PUBLICATIONS

Machine translation of Detailed Description of JP 2004-099753A; publication date: Apr. 2004.*
Apr. 19, 2016 International Search Report issued in International Patent Application No. PCT/JP2016/053885.

* cited by examiner

*Primary Examiner* — Fred M Teskin
(74) *Attorney, Agent, or Firm* — Oliff PLC

(57) ABSTRACT

A cross-linked rubber product for a fuel seal is obtained by cross-linking a nitrile rubber composition including a nitrile rubber (A) containing 25 to 80% by weight of $\alpha,\beta$-ethylenically unsaturated nitrile monomer units (a1), 20 to 75% by weight of conjugated diene monomer units (a2), and 0 to 30% by weight of cationic monomer units and/or monomer units capable of forming a cation (a3), and having a compression set ratio of 20% or less after being compressed in an atmosphere of 100° C. for 70 hours, and an inorganic filler (B) having an aspect ratio of 30 to 2,000. The content of the inorganic filler (B) is from 1 to 200 parts by weight with respect to 100 parts by weight of the nitrile rubber (A). The cross-linked rubber product is obtained by subjecting the nitrile rubber composition to secondary vulcanization at 100 to 150° C. for 1 to 24 hours.

5 Claims, No Drawings

CROSS-LINKED RUBBER PRODUCT

TECHNICAL FIELD

The present invention relates to a cross-linked rubber product having excellent compression set resistance and capable of being used suitably for a fuel seal.

BACKGROUND ART

Conventionally, a rubber (nitrile rubber) containing an α,β-ethylenically unsaturated nitrile monomer unit and a conjugated diene monomer unit or an olefin monomer unit has been known as a rubber having excellent oil resistance, and a cross-linked product thereof has been used as a material for a rubber product around various oils mainly for an automobile, mainly such as a fuel hose.

In this application, excellent oil resistance is also an important requested matter. Recently, due to growing global environmental protection activities, efforts to reduce the transpiration amount of a fuel such as gasoline into the atmosphere have advanced. For example, in Japan and Europe, NOx emission is regulated, and reduction in the transpiration amount of a fuel is required along therewith. Therefore, in an application such as a fuel hose or a fuel seal, low gasoline permeability, that is, better gasoline permeability resistance is required.

For example, in Patent Literature 1, by cross-linking a nitrile rubber composition obtained by adding an inorganic filler having a predetermined aspect ratio, a predetermined amount of a coupling agent, and a predetermined amount of a glycol compound to a nitrile rubber containing a predetermined amount of an α,β-ethylenically unsaturated nitrile monomer unit, a cross-linked rubber product suitable for a fuel hose is obtained.

CITATION LIST

Patent Literature

Patent Literature 1: WO 2011/115093 A

SUMMARY OF INVENTION

Technical Problem

Incidentally, according to the studies of the present inventor, it has been found that a cross-linked rubber product described in Patent Literature 1 has poor compression set resistance when being used directly for a fuel seal.

An object of the present invention is to provide a cross-linked rubber product having excellent compression set resistance and capable of being used suitably for a fuel seal.

Solution to Problem

The present inventor made intensive studies in order to achieve the above object. As a result, the present inventor has found that the above object can be achieved by vulcanizing a nitrile rubber composition containing a nitrile rubber having a predetermined compression set, and then performing secondary vulcanization under predetermined conditions, and has completed the present invention.

That is, the present invention provides:

(1) a cross-linked rubber product for a fuel seal, obtained by cross-linking a nitrile rubber composition including a nitrile rubber (A) containing 25 to 80% by weight of α,β-ethylenically unsaturated nitrile monomer units (a1), 20 to 75% by weight of conjugated diene monomer units (a2), and 0 to 30% by weight of cationic monomer units and/or monomer units capable of forming a cation (a3), and having a compression set ratio of 20% or less after being compressed in an atmosphere of 100° C. for 70 hours, and an inorganic filler (B) having an aspect ratio of 30 to 2,000, a content of the inorganic filler (B) being from 1 to 200 parts by weight with respect to 100 parts by weight of the nitrile rubber (A), and obtained by subjecting the nitrile rubber composition to secondary vulcanization at 100 to 150° C. for 1 to 24 hours;

(2) the cross-linked rubber product described in (1), in which the nitrile rubber (A) has been hydrogenated;

(3) the cross-linked rubber product described in (1) or (2), in which the nitrile rubber composition further contains a vinyl chloride resin (C), and a content of the vinyl chloride resin (C) is from 10 to 150 parts by weight with respect to 100 parts by weight of the nitrile rubber (A);

(4) the cross-linked rubber product described in any one of (1) to (3), in which the nitrile rubber composition further contains a plasticizer (D) having an SP value by a HOY method of 8 to 10.2 $(cal/cm^3)^{1/2}$, and a content of the plasticizer (D) is from 3 to 100 parts by weight with respect to 100 parts by weight of the nitrile rubber (A); and (5) the cross-linked rubber product described in any one of (1) to (4), in which the nitrile rubber composition further contains a coupling agent (E) and a glycol compound (F), a content of the coupling agent (E) is from 0.05 to 15 parts by weight with respect to 100 parts by weight of the nitrile rubber (A), and a content of the glycol compound (F) is from 0.05 to 15 parts by weight with respect to 100 parts by weight of the nitrile rubber (A).

Advantageous Effects of Invention

The cross-linked rubber product of the present invention has excellent compression set resistance and can be used suitably for a fuel seal.

DESCRIPTION OF EMBODIMENTS

Hereinafter, a cross-linked rubber product of the present invention will be described. The cross-linked rubber product of the present invention is a cross-linked rubber product for a fuel seal, obtained by cross-linking a nitrile rubber composition including a nitrile rubber (A) containing 25 to 80% by weight of α,β-ethylenically unsaturated nitrile monomer units (a1), 20 to 75% by weight of conjugated diene monomer units (a2), and 0 to 30% by weight of cationic monomer units and/or monomer units capable of forming a cation (a3), and having a compression set ratio of 20% or less after being compressed in an atmosphere of 100° C. for 70 hours, and an inorganic filler (B) having an aspect ratio of 30 to 2,000, a content of the inorganic filler (B) being from 1 to 200 parts by weight with respect to 100 parts by weight of the nitrile rubber (A), and obtained by subjecting the nitrile rubber composition to secondary vulcanization at 100 to 150° C. for 1 to 24 hours.

(Nitrile Rubber (A))

The nitrile rubber (A) used in the present invention contains 25 to 80% by weight of the α,β-ethylenically unsaturated nitrile monomer units (a1), 20 to 75% by weight of the conjugated diene monomer units (a2), and 0 to 30% by weight of the cationic monomer units and/or the monomer units capable of forming a cation (a3), and has a compression set ratio of 20% or less after being compressed in an atmosphere of 100° C. for 70 hours.

An α,β-ethylenically unsaturated nitrile monomer to form the α,β-ethylenically unsaturated nitrile monomer unit (a1) is not particularly limited as long as being an α,β-ethylenically unsaturated compound having a nitrile group. However, examples thereof include acrylonitrile; an α-halogeno acrylonitrile such as α-chloro acrylonitrile or α-bromo acrylonitrile; and an α-alkyl acrylonitrile such as methacrylonitrile. Among these compounds, acrylonitrile and methacrylonitrile are preferable, and acrylonitrile is particularly preferable. These compounds may be used singly or in combination of a plurality of kinds thereof.

A content ratio of the α,β-ethylenically unsaturated nitrile monomer unit (a1) in the nitrile rubber (A) is from 25 to 80% by weight, preferably from 30 to 70% by weight, and more preferably from 35 to 60% by weight with respect to the total monomer units. When the content ratio of the α,β-ethylenically unsaturated nitrile monomer unit (a1) is too small, oil resistance of an obtained cross-linked rubber product is deteriorated, and gasoline permeability resistance of the obtained cross-linked rubber product is deteriorated. On the other hand, when the content ratio of the α,β-ethylenically unsaturated nitrile monomer unit (a1) is too large, the brittleness temperature of an obtained cross-linked rubber product is high, and cold resistance of the obtained cross-linked rubber product is poor.

The nitrile rubber (A) used in the present invention contains the conjugated diene monomer unit (a2) in order to obtain a cross-linked rubber product having rubber elasticity. Note that, a part of the conjugated diene monomer unit (a2) may be hydrogenated.

As a conjugated diene monomer to form the conjugated diene monomer unit (a2), a conjugated diene monomer having 4 to 6 carbon atoms is preferable, and examples thereof include 1,3-butadiene, isoprene, 2,3-dimethyl-1,3-butadiene, and 1,3-pentadiene. Among these compounds, 1,3-butadiene is preferable. These compounds may be used singly or in combination of a plurality of kinds thereof.

A content ratio of the conjugated diene monomer unit (a2) in the nitrile rubber (A) is from 20 to 75% by weight, preferably from 29.9 to 69.9% by weight, and more preferably from 39.7 to 64.7% by weight with respect to the total monomer units.

When the content ratio of the conjugated diene monomer unit (a2) is too small, rubber elasticity of an obtained cross-linked rubber product may be lowered. On the other hand, when the content ratio of the conjugated diene monomer unit (a2) is too large, gasoline permeability resistance of an obtained cross-linked rubber product may be deteriorated.

Further, the nitrile rubber (A) used in the present invention may optionally contain the cationic monomer unit and/or the monomer unit capable of forming a cation (a3).

A cation-containing monomer to form the cationic monomer unit is not particularly limited as long as being a monomer to form a monomer unit to be positively charged when a polymer obtained from the monomer is in contact with water or an acid aqueous solution. Examples of such a cation-containing monomer include a monomer containing a quaternary ammonium base. Examples of a monomer to form the monomer unit capable of forming a cation include a monomer having a precursor portion (substituent) such as a tertiary amino group to form a cation such as an ammonium salt (for example, amine hydrochloride or amine sulfate) when being in contact with an acid aqueous solution such as hydrochloric acid or sulfuric acid.

Specific examples of the cation-containing monomer include a (meth)acrylate monomer containing a quaternary ammonium salt-containing group, such as (meth)acryloyloxy trimethyl ammonium chloride, (meth)acryloyloxy hydroxypropyl trimethyl ammonium chloride, (meth)acryloyloxy triethyl ammonium chloride, (meth)acryloyloxy dimethyl benzyl ammonium chloride, or (meth)acryloyloxy trimethyl ammonium methyl sulfate; and a (meth)acrylamide monomer containing a quaternary ammonium salt-containing group, such as (meth)acrylamide propyl trimethyl ammonium chloride or (meth)acrylamide propyl dimethyl benzyl ammonium chloride.

Specific examples of the monomer to form the monomer unit capable of forming a cation include a vinyl group-containing cyclic tertiary amine monomer such as 2-vinylpyridine or 4-vinylpyridine; a tertiary amino group-containing (meth)acrylate monomer such as dimethyl aminoethyl (meth)acrylate; a tertiary amino group-containing (meth)acrylamide monomer such as dimethylaminoethyl (meth)acrylamide or N-N-dimethylaminopropyl acrylamide; N-(4-anilinophenyl) acrylamide, N-(4-anilinophenyl) methacrylamide, N-(4-anilinophenyl) cinnamamide, N-(4-anilinophenyl) crotonamide, N-phenyl-4-(3-vinyl benzyloxy) aniline, and N-phenyl-4-(4-vinyl benzyloxy) aniline. These compounds may be used singly or in combination of a plurality of kinds thereof.

Among the above monomers, a vinyl group-containing cyclic tertiary amine monomer, a tertiary amino group-containing (meth)acrylate monomer, and a tertiary amino group-containing (meth)acrylamide monomer are preferable, a vinyl group-containing cyclic tertiary amine monomer and a tertiary amino group-containing acrylamide monomer are more preferable, a vinyl group-containing cyclic tertiary amine monomer is still more preferable, vinyl group-containing pyridines are particularly preferable among the compounds, and 2-vinylpyridine is most preferable because the present invention obtains a more remarkable effect.

A content ratio of the cationic monomer unit and/or the monomer unit capable of forming a cation (a3) is from 0 to 30% by weight, preferably from 0.1 to 20% by weight, and more preferably from 0.3 to 10% by weight with respect to the total monomer units. An obtained cross-linked rubber product has better gasoline permeability resistance due to inclusion of the cationic monomer unit and/or the monomer unit capable of forming a cation (a3).

In addition to the α,β-ethylenically unsaturated nitrile monomer unit (a1), the conjugated diene monomer unit (a2), and the cationic monomer unit and/or the monomer unit capable of forming a cation (a3), the nitrile rubber (A) used in the present invention may contain another monomer unit copolymerizable with monomers to form these monomer units. A content ratio of such another monomer unit is preferably 30% by weight or less, more preferably 20% by weight or less, and still more preferably 10% by weight or less with respect to the total monomer units.

Examples of such another copolymerizable monomer unit include a fluorine-containing vinyl compound such as fluoroethyl vinyl ether, fluoropropyl vinyl ether, o-(trifluoro) methyl styrene, vinyl pentafluorobenzoate, difluoroethylene, or tetrafluoroethylene; a non-conjugated diene compound such as 1,4-pentadiene, 1,4-hexadiene, vinyl norbornene, or dicyclopentadiene; ethylene; an α-olefin compound such as propylene, 1-butene, 4-methyl-l-pentene, 1-hexene, or 1-octene; an α,β-ethylenically unsaturated monocarboxylic acid such as acrylic acid or methacrylic acid; an α,β-ethylenically unsaturated polycarboxylic acid and an anhydride thereof, such as maleic acid, maleic anhydride, itaconic acid, itaconic anhydride, or fumaric acid; an α,β-ethylenically unsaturated carboxylic acid alkyl ester such as methyl (meth)acrylate, ethyl (meth)acrylate, butyl (meth)acrylate, or 2-ethylhexyl (meth)acrylate; a monoester or a diester of an α,β-ethylenically unsaturated polycarboxylic acid, such as monoethyl maleate, diethyl maleate, monobutyl maleate, dibutyl maleate, monoethyl fumarate, diethyl fumarate, monobutyl fumarate, dibutyl fumarate, monocyclohexyl fumarate, dicyclohexyl fumarate, monoethyl itaconate, diethyl itaconate, monobutyl itaconate, or dibutyl itaconate; an alkoxyalkyl ester of an α,β-ethylenically unsaturated carboxylic acid such as methoxyethyl (meth)acrylate, methoxypropyl (meth)acrylate, or butoxyethyl (meth)acrylate; a hydroxyalkyl ester of an α,β-ethylenically unsaturated carboxylic acid, such as 2-hydroxyethyl (meth)acrylate or 3-hydroxypropyl (meth)acrylate; a divinyl compound such as divinylbenzene; di(meth)acrylates such as ethylene di(meth)acrylate, diethylene glycol di(meth)acrylate, or ethylene glycol di(meth)acrylate; and a polyfunctional ethylenically unsaturated monomer, examples of which include tri(meth)acrylates such as trimethylolpropane tri(meth)acrylate. Examples of such another copolymerizable monomer unit further include a self-cross-linkable compound such as N-methylol (meth)acrylamide or N,N'-dimethylol (meth) acrylamide.

The Mooney viscosity (hereinafter, also referred to as "polymer Mooney viscosity") ($ML_{1+4}$, 100° C.) of the nitrile rubber (A) is preferably from 3 to 250, more preferably from 15 to 180, and still more preferably from 20 to 160. When the polymer Mooney viscosity of the nitrile rubber (A) is within the above range, a phenomenon that a strength characteristic of an obtained cross-linked rubber product is lowered due to an excessively low polymer Mooney viscosity can be suppressed, and a phenomenon that processability is deteriorated due to an excessively high polymer Mooney viscosity can be suppressed.

The nitrile rubber (A) used in the present invention can be manufactured by copolymerizing the above monomers constituting the nitrile rubber (A). A method for copolymerizing the monomers is not particularly limited. However, preferable examples thereof include an emulsion polymerization method for obtaining a latex of a copolymer having an average particle diameter of about 50 to 1000 nm using an emulsifier such as sodium dodecylbenzene sulfonate, and a suspension polymerization method (including a fine suspension polymerization method) for obtaining an aqueous dispersion of a copolymer having an average particle diameter of about 0.2 to 200 μm using a dispersing agent such as polyvinyl alcohol. The emulsion polymerization method is more preferable of these methods due to easy control of a polymerization reaction.

For example, the emulsion polymerization method is preferably performed according to the following procedure.

Note that hereinafter, the α,β-ethylenically unsaturated nitrile monomer is referred to as a "monomer (m1)", the conjugated diene monomer is referred to as a "monomer (m2)", and the cationic monomer and/or the monomer capable of forming a cation is referred to as a "monomer (m3)" appropriately.

That is, a method for subjecting a monomer mixture including 25 to 80% by weight, preferably 30 to 70% by weight, more preferably 35 to 60% by weight of the monomers (m1), 20 to 75% by weight, preferably 29.9 to 69.9% by weight, more preferably 39.7 to 64.7% by weight of the monomers (m2), and 0 to 30% by weight, preferably 0.1 to 20% by weight, particularly preferably 0.3 to 10% by weight of the monomers (m3) (the total amount of the monomers (m1), the monomers (m2), and the monomers (m3) is 100% by weight) to emulsion polymerization, and removing unreacted monomers if desired after termination of the polymerization reaction when a polymerization conversion ratio reaches preferably 50 to 95% by weight is preferable.

When the use amount of the monomers (m1) used in the emulsion polymerization method is too small, oil resistance of an obtained cross-linked rubber product is deteriorated, and gasoline permeability resistance of the obtained cross-linked rubber product is deteriorated. On the other hand, when the use amount of the monomers (m1) is too large, cold resistance tends to be deteriorated. When the use amount of the monomers (m2) is too small, cold resistance of an obtained cross-linked rubber product is deteriorated. On the other hand, when the use amount of the monomers (m2) is too large, gasoline permeability resistance of an obtained cross-linked rubber product tends to be deteriorated. In addition, use of the monomers (m3) within the above range can further improve gasoline permeability resistance of an obtained cross-linked rubber product.

Note that, when a polymerization conversion ratio at which the polymerization reaction is terminated is too low, it is very difficult to recover unreacted monomers. On the other hand, a polymerization conversion ratio is too high, original state properties of an obtained cross-linked rubber product are deteriorated.

In emulsion polymerization, an emulsifier, a polymerization initiator, a polymerization auxiliary material, or the like conventionally known in the field of emulsion polymerization can be used appropriately, and it is only required to adjust the polymerization temperature and the polymerization time appropriately.

Further, a polymerization reaction may be initiated using the total amount of the monomers (m1) to monomers (m3) used in emulsion polymerization. However, preferably, a polymerization reaction is initiated using a part of the total amount of the monomers (m1) to the monomers (m3) used in emulsion polymerization, and the residues of the monomers (m1) to monomers (m3) used in emulsion polymerization are then added to a reactor at an intermediate stage to continue the polymerization reaction from a viewpoint of controlling a composition distribution of monomer units of a generated copolymer and obtaining a cross-linked rubber product having better rubber elasticity. This is because a composition distribution of a copolymer is broadened if the total amount of the monomers (m1) to monomers (m3) used in emulsion polymerization are all used for reaction at the time of initiation of the polymerization reaction.

In this case, it is preferable to put a monomer mixture including preferably 10 to 100% by weight, more preferably 20 to 100% by weight, particularly preferably 30 to 100% by weight of the monomers (m1) used for polymerization, preferably 5 to 90% by weight, more preferably 10 to 80% by weight, particularly preferably 15 to 70% by weight of the monomers (m2) used for polymerization, and preferably 0 to 100% by weight, more preferably 30 to 100% by weight, particularly preferably 70 to 100% by weight of the monomers (m3) used for polymerization into a reactor to initiate a polymerization reaction, and then to add the residual monomers to the reactor within a range preferably of 5 to 80% by weight of a polymerization conversion ratio with respect to the monomer mixture put into the reactor to continue the polymerization reaction. Note that, even when the monomers (m3) are not used, it is preferable to initiate a polymerization reaction using the monomers (m1) and the monomers (m2) used for polymerization in the amounts described above, and to add the residues of the monomers (m1) and the monomers (m2) to the reactor for polymerization.

A method for adding the residual monomers is not particularly limited. The residual monomers may be added at once, in batches, or continuously. In the present invention, the residual monomers are added preferably in batches, particularly preferably in 1 to 6 portions from a viewpoint of more easily controlling a composition distribution of an obtained copolymer. When the residual monomers are added in batches, it is only required to adjust the amount of monomers to be added in batches or the timing for addition in batches according to progress of a polymerization reaction so as to obtain the desired nitrile rubber (A).

By removing an unreacted monomers by a known method such as heat distillation, reduced pressure distillation, or steam distillation if desired after termination of the polymerization reaction, a latex of the nitrile rubber (A) is obtained. In the present invention, the solid content concentration of a latex of the nitrile rubber (A) obtained by an emulsion polymerization method is preferably from 5 to 70% by weight, more preferably from 10 to 60% by weight, and particularly preferably from 15 to 50% by weight.

Note that, the nitrile rubber (A) used in the present invention may be a hydrogenated nitrile rubber in which at least a part of a conjugated diene monomer unit of a copolymer obtained by copolymerization as described above has been hydrogenated (subjected to a hydrogenation reaction). Note that, in the present invention, the conjugated diene monomer unit includes a unit having a structure in which a conjugated diene monomer unit has been hydrogenated (saturated conjugated diene monomer unit).

A method for hydrogenation is not particularly limited, but a known method can be used. When the nitrile rubber (A) is formed into a hydrogenated nitrile rubber, the iodine value thereof is preferably from 0 to 70, and more preferably from 4 to 60. By hydrogenating the nitrile rubber (A) to obtain a hydrogenated nitrile rubber, heat resistance, weather resistance, ozone resistance, or the like can be improved.

Further, the nitrile rubber (A) used in the present invention has a compression set ratio (Cs) of 20% or less, preferably of 15% or less after being compressed under an atmosphere of 100° C. for 70 hours. Here, as for the compression set ratio of the nitrile rubber (A), the compression set ratio of a cross-linked rubber product obtained by cross-linking a nitrile rubber composition obtained by adding a cross-linking agent described below, carbon black as necessary, or the like to the nitrile rubber (A), can be measured based on JIS K6262, for example.

Note that, the cross-linked rubber product used for measuring the compression set ratio can be manufactured by a method described in Examples described below. In this case, the cross-linking temperature is from 100° C. to 120° C., and the cross-linking time is from one hour to 24 hours in secondary vulcanization.

(Inorganic Filler (B))

The inorganic filler (B) is an inorganic filler having an aspect ratio of 30 to 2,000, and has a flat shape. The aspect ratio is preferably from 35 to 1,500, more preferably from 40 to 1,000, and particularly preferably from 45 to 800. Use of the flat shaped inorganic filler (B) can bring about a penetration blocking effect of gasoline to an obtained cross-linked rubber product. In addition, by using the inorganic filler (B) having an aspect ratio within the above range among the flat shaped inorganic fillers, and by combining the nitrile rubber (A) therewith, an obtained cross-linked rubber product can have excellent gasoline permeability resistance. When the aspect ratio is too small, gasoline permeability resistance of an obtained cross-linked rubber product may be deteriorated. On the other hand, when the aspect ratio is too large, dispersion in the nitrile rubber (A) is difficult, and the strength may be lowered.

Note that, the aspect ratio of the inorganic filler (B) in the present invention can be calculated by determining a ratio between a planar average diameter and an average thickness of primary particles of the inorganic filler (B). Here, the planar average diameter and the average thickness are number average values obtained by measuring diameters in a plane direction and thicknesses of randomly selected 100 particles of the inorganic fillers (B) with an atomic force microscope, and calculating an arithmetic average value thereof.

The flat inorganic filler (B) having an aspect ratio of 30 to 2,000 is not particularly limited, but may be a filler derived from a natural product, a filler obtained by subjecting a natural product to a treatment such as purification, or a synthetic product. Specific examples thereof include a kaolinite such as kaolinite or halloysite; smectites such as montmorillonite, beidellite, nontronite, saponite, hectorite, stevensite, or mica; vermiculites; chlorites; talc; and glass flakes which are amorphous plate-shaped particles, such as E glass or C glass. Among these compounds, smectites are preferable, and montmorillonite, mica, and saponite are particularly preferable. These compounds can be used singly or in combination of a plurality of kinds thereof. Particularly, in the present invention, it is preferable to use a product obtained by separating layers constituting each of montmorillonite, mica, and saponite which are compounds with a multilayer structure by subjecting montmorillonite, mica, and saponite to a water dispersion treatment. By performing such a water dispersion treatment, a composition having excellent dispersibility can be obtained. Here, among the above compounds, montmorillonite as the inorganic filler (B) is contained in bentonite as a main component. Therefore, as montmorillonite, a product obtained by purifying bentonite or the like can be used.

Note that, montmorillonite, mica, and saponite can be used suitably because each of montmorillonite, mica, and saponite has a multilayer structure having an exchangeable cation between layers, and therefore has excellent dispersibility in the nitrile rubber (A) containing the cationic monomer unit and/or the monomer unit capable of forming a cation (a3). Particularly, by enhancing dispersibility of the inorganic filler (B) in the nitrile rubber (A), gasoline permeability of an obtained cross-linked rubber product can be smaller, and the brittleness temperature thereof can be lower. Note that, a ratio between the inorganic filler (B) and the cationic monomer unit and/or the monomer unit capable of forming a cation (a3) (inorganic filler (B): cationic monomer unit and/or monomer unit capable of forming a cation (a3)) is preferably from 1:0.0005 to 1:30, and more preferably from 1:0.003 to 1:5 in terms of weight ratio when the nitrile rubber (A) contains the cationic monomer unit and/or the monomer unit capable of forming a cation (a3). When the ratio is outside the above range, it may be difficult to obtain the above effect.

An average particle diameter (average primary particle diameter) of the inorganic filler (B) is preferably from 0.001 to 20 µm, more preferably from 0.005 to 15 µm, and still more preferably from 0.01 to 10 µm. In the present invention, the average particle diameter of the inorganic filler (B) is defined by a 50% volume cumulative diameter determined by measuring a particle size distribution by an X-ray transmission method. When the particle diameter of the inorganic filler (B) is within the above range, a phenomenon that the elongation of an obtained cross-linked rubber product is lowered due to an excessively small particle diameter of the inorganic filler (B) can be suppressed, and a phenomenon that a stable latex composition cannot be prepared due to an excessively large particle diameter of the inorganic filler (B) can be suppressed.

The content of the inorganic filler (B) is from 1 to 200 parts by weight, preferably from 2 to 150 parts by weight, more preferably from 3 to 120 parts by weight, and still more preferably from 3 to 60 parts by weight with respect to 100 parts by weight of the nitrile rubber (A). When the use amount of the inorganic filler (B) is too small, gasoline permeability resistance of an obtained cross-linked rubber product may be lowered. On the other hand, when the use amount of the inorganic filler (B) is too large, the elongation of an obtained cross-linked rubber product may be lowered.

(Vinyl Chloride Resin (C))

The nitrile rubber composition used in the present invention can contain, in addition to the nitrile rubber (A), a polymer such as another rubber or a resin in a range not inhibiting an effect of the present invention, and may further contain a vinyl chloride resin. By inclusion of the vinyl chloride resin (C), ozone resistance of an obtained cross-linked rubber product can be further improved.

The vinyl chloride resin (C) which can be used in the present invention is a thermoplastic resin containing vinyl chloride as a main monomer constituting the resin. The content of the monomer unit is preferably from 50 to 100% by weight, more preferably from 60 to 100% by weight, and particularly preferably from 70 to 100% by weight.

The vinyl chloride resin (C) is preferably granular. The volume average particle diameter thereof is preferably from 0.01 μm to 1 mm, more preferably from 0.05 to 100 μm, and particularly preferably from 0.1 to 10 μm. The volume average particle diameter is measured with a laser diffraction scattering particle size measuring device. When the volume average particle diameter of the vinyl chloride resin (C) is within the above range, a phenomenon that ozone resistance of a cross-linked rubber product is lowered due to an excessively small volume average particle diameter of the vinyl chloride resin (C) can be suppressed, and a phenomenon that poor dispersion occurs during kneading due to an excessively large volume average particle diameter of the vinyl chloride resin (C) can be suppressed.

Further, Tg (glass transition temperature measured with a differential scanning calorimetry (DSC)) of the vinyl chloride resin (C) is preferably from 50 to 180° C., and particularly preferably from 60 to 150° C.

The polymerization degree or molecular weight of the vinyl chloride resin (C) is not particularly limited. However, the average polymerization degree measured by a solution viscosity method defined in JIS K6721 is preferably from 400 to 3,000, and more preferably from 600 to 2,000.

When the polymerization degree is within the above range or the molecular weight is a molecular weight corresponding to a polymerization degree within the above range, a phenomenon that ozone resistance of an obtained cross-linked rubber product is deteriorated due to an excessively small polymerization degree or molecular weight can be suppressed, and a phenomenon that forming processability is poor due to an excessively large polymerization degree or molecular weight can be suppressed.

When the vinyl chloride resin (C) is contained, the content of the vinyl chloride resin (C) is preferably from 10 to 150 parts by weight, more preferably from 10 to 120 parts by weight, still more preferably from 20 to 100 parts by weight, and particularly preferably from 40 to 90 parts by weight with respect to 100 parts by weight of the nitrile rubber (A). When the content of the vinyl chloride resin (C) is within the above range, a phenomenon that an effect exhibited by addition of the vinyl chloride resin (C) is hardly obtained due to an excessively small content of the vinyl chloride resin (C) can be suppressed, and a phenomenon that cold resistance is deteriorated due to an excessively large content of the vinyl chloride resin (C) can be suppressed.

(Plasticizer (D))

The nitrile rubber composition used in the present invention preferably contains the plasticizer (D). By using the plasticizer (D) having an SP value (solubility parameter) by a HOY method of 8.0 to 10.2 $(cal/cm^3)^{1/2}$ as the plasticizer (D), an obtained cross-linked rubber product has excellent gasoline permeability resistance and excellent cold resistance due to a lowered brittleness temperature.

Specific examples of the plasticizer (D) (unit of SP value: "$(cal/cm^3)^{1/2}$") include an ester compound of adipic acid and an ether bond-containing alcohol, such as dibutoxyethyl adipate (SP value: 8.8), di(butoxyethoxyethyl) adipate (SP value: 9.2), di(methoxytetraethylene glycol) adipate, di(methoxypentaethylene glycol) adipate, (methoxytetraethylene glycol) (methoxypentaethylene glycol) adipate, di(methoxytriethoxyethyl) adipate, (methoxytriethoxyethyl) (methoxytetraethoxyethyl) adipate, di(methoxytetraethoxyethyl) adipate, (butoxytriethoxyethyl) (pentoxytetraethoxyethyl) adipate, or (pentoxytriethoxyethyl) (pentoxytetraethoxyethyl) adipate; an ester compound of azelaic acid and an ether bond-containing alcohol, such as dibutoxyethyl azelate or di(butoxyethoxyethyl) azelate; an ester compound of sebacic acid and an ether bond-containing alcohol, such as dibutoxyethyl sebacate or di(butoxyethoxyethyl) sebacate; an ester compound of phthalic acid and an ether bond-containing alcohol, such as dibutoxyethyl phthalate or di(butoxyethoxyethyl) phthalate; an ester compound of isophthalic acid and an ether bond-containing alcohol, such as dibutoxyethyl isophthalate or di(butoxyethoxyethyl) isophthalate; adipic acid dialkyl esters such as di-(2-ethylhexyl) adipate (SP value: 8.5), diisodecyl adipate (SP value: 8.3), diisononyl adipate, or dibutyl adipate (SP value: 8.9); azelaic acid dialkyl esters such as di-(2-ethylhexyl) azelate (SP value: 8.5), diisooctyl azelate, or di-n-hexyl azelate; sebacic acid dialkyl esters such as di-n-butyl sebacate (SP value: 8.7) or di-(2-ethylhexyl) sebacate (SP value: 8.4); phthalic acid dialkyl esters such as dibutyl phthalate (SP value: 9.4), di-(2-ethylhexyl) phthalate (SP value: 9.0), di-n-octyl phthalate, diisobutyl phthalate, diheptyl phthalate (SP value: 9.0), diisodecyl phthalate (SP value: 8.5), diundecyl phthalate (SP value: 8.5), or diisononyl phthalate (SP value: 8.9);

phthalic acid dicycloalkyl esters such as dicyclohexyl phthalate; phthalic acid aryl esters such as diphenyl phthalate or butyl benzyl phthalate (SP value: 10.2); isophthalic acid dialkyl esters such as di-(2-ethylhexyl) isophthalate or diisooctyl isophthalate; tetrahydrophthalic acid dialkyl esters such as di-(2-ethylhexyl) tetrahydrophthalate, di-n-octyl tetrahydrophthalate, or diisodecyl tetrahydrophthalate; a trimellitic acid derivative such as tri-(2-ethylhexyl) trimellitate (SP value: 8.9), tri-n-octyl trimellitate (SP value: 8.9), triisodecyl trimellitate (SP value: 8.4), triisooctyl trimellitate, tri-n-hexyl trimellitate, triisononyl trimellitate (SP value: 8.8), or triisodecyl trimellitate (SP value: 8.8); an epoxy-based plasticizer such as epoxidized soybean oil (SP value: 9.0) or epoxidized linseed oil (SP value: 9.3); and a phosphate-based plasticizer such as tricresyl phosphate (SP value: 9.7). These compounds can be used singly or in combination of a plurality of kinds thereof.

Among these compounds, an ester compound of a dibasic acid such as adipic acid, azelaic acid, sebacic acid, or phthalic acid and an ether bond-containing alcohol is preferable, an ester compound of adipic acid and an ether bond-containing alcohol is more preferable, and di(butoxyethoxyethyl) adipate is particularly preferable because an obtained cross-linked rubber product can have excellent gasoline permeability resistance and cold resistance.

A content ratio of the plasticizer (D) in the nitrile rubber composition used in the present invention is preferably from 3 to 100 parts by weight, and more preferably 10 to 60 parts by weight with respect to 100 parts by weight of the nitrile rubber (A) from a viewpoint of preventing bleeding and obtaining a more remarkable effect of the present invention (Coupling Agent (E))

The nitrile rubber composition used in the present invention may contain a predetermined amount of the coupling agent (E). Here, the coupling agent (E) means a compound having a functional group to be bonded to a hydroxyl group (—OH) on a surface of the inorganic filler (B).

Inclusion of the coupling agent (E) can improve dispersibility between the nitrile rubber (A) and the inorganic filler (B), and can improve cold resistance when a cross-linked rubber product is obtained. Note that, the coupling agent (E) is not particularly limited, but a titanate-based coupling agent and a silane coupling agent are preferable, a silane coupling agent is more preferable, and a silane coupling agent containing no sulfur atom is particularly preferable because a more remarkable effect of the present invention is obtained.

Further, the coupling agent (E) which can be used in the present invention has a molecular weight preferably of 400 or less, and more preferably of 300 or less. When the molecular weight is within the above range, a phenomenon that an effect exhibited by addition of the coupling agent (E), that is, an effect of improving cold resistance is not obtained due to an excessively large molecular weight of the coupling agent (E) can be suppressed.

Specific examples of the coupling agent (E) include a sulfide group-containing silane coupling agent such as bis (3-(triethoxysilyl) propyl) disulfide or bis(3-(triethoxysilyl) propyl) tetrasulfide; a mercapto group-containing silane coupling agent such as γ-mercaptopropyl trimethoxysilane, γ-mercaptomethyl trimethoxysilane, γ-mercaptomethyl triethoxysilane, or γ-mercaptohexamethyl disilazane; an epoxy group-containing silane coupling agent such as γ-glycidoxypropyl trimethoxysilane, γ-glycidoxypropyl methyldimethoxysilane, β-(3,4-epoxycyclohexyl) ethyltrimethoxysilane, or γ-glycidoxypropyl methyldiethoxysilane; an amino group-containing silane coupling agent such as N-(β-aminoethyl)-γ-aminopropyl trimethoxysilane, γ-aminopropyl trimethoxysilane, γ-aminopropyl triethoxysilane, N-2-(aminoethyl)-3-aminopropyl trimethoxysilane, N-2-(aminoethyl) -3-aminopropyl triethoxysilane, 3-triethoxysilyl-N-(1,3-dimethyl-butylidene) propylamine, or N-phenyl-3-aminopropyl trimethoxysilane; a (meth)acryloxy group-containing silane coupling agent such as γ-methacryloxypropyl trimethoxysilane, γ-methacryloxypropyl tris(β-methoxyethoxy) silane, γ-methacryloxypropyl methyl dimethoxy silane, γ-methacryloxypropyl methyl diethoxy silane, γ-methacryloxypropyl triethoxysilane, or γ-acryloxypropyl trimethoxysilane; a vinyl group-containing silane coupling agent such as vinyl trimethoxysilane, vinyl triethoxysilane, vinyl tris(β-methoxyethoxy) silane, vinyl trichlorosilane, or vinyl triacetoxysilane; a chloropropyl group-containing silane coupling agent such as 3-chloropropyl trimethoxysilane; an isocyanate group-containing silane coupling agent such as 3-isocyanatopropyl triethoxysilane; a styryl group-containing silane coupling agent such as p-styryl trimethoxysilane; a ureido group-containing silane coupling agent such as 3-ureidopropyl triethoxysilane; an allyl group-containing silane coupling agent such as diallyldimethyl silane; an alkoxy group-containing silane coupling agent such as tetraethoxysilane; a phenyl group-containing silane coupling agent such as diphenyldimethoxy silane; a fluoro group-containing silane coupling agent such as trifluoropropyl trimethoxy silane; an alkyl group-containing silane coupling agent such as isobutyl trimethoxysilane or cyclohexylmethyl dimethoxy silane; an aluminum-based coupling agent such as acetoalkoxyaluminum diisopropylate; and a titanate-based coupling agent such as isopropyl triisostearoyl titanate, isopropyl tris(dioctyl pyrophosphate) titanate, isopropyl tri(N-aminoethyl-aminoethyl) titanate, tetraoctylbis(ditridecyl phosphite) titanate, tetra(2,2-diallyloxymethyl-1-butyl) bis(ditridecyl) phosphite titanate, bis (dioctyl pyrophosphate) oxyacetate titanate, bis(dioctyl pyrophosphate) ethylene titanate, tetraisopropyl bis(dioctyl phosphite) titanate, or isopropyl triisostearoyl titanate. Among these compounds, an epoxy group-containing silane coupling agent is preferable, and β-(3,4-epoxycyclohexyl) ethyltrimethoxysilane is particularly preferable because a more remarkable effect of the present invention is obtained. These compounds may be used singly or in combination of a plurality of kinds thereof.

The content of the coupling agent (E) is preferably from 0.05 to 15 parts by weight, more preferably from 0.1 to 10 parts by weight, and still more preferably from 0.2 to 5 parts by weight with respect to 100 parts by weight of the nitrile rubber (A). When the content of the coupling agent (E) is within the above range, a phenomenon that an effect of improving cold resistance cannot be obtained due to an excessively small content of the coupling agent (E) can be suppressed, and a phenomenon that gasoline permeability resistance and solvent crack resistance are lowered due to an excessively large content of the coupling agent (E) can be suppressed.

(Glycol Compound (F))

The nitrile rubber composition used in the present invention may contain a predetermined amount of the glycol compound (F). Particularly, in the present invention, when a nitrile rubber composition containing the glycol compound (F) in combination with the coupling agent (E) is cross-linked to obtain a cross-linked rubber product, the obtained cross-linked rubber product can have excellent solvent crack resistance while maintaining excellent gasoline permeability resistance, excellent cold resistance, and excellent sour gasoline resistance.

Here, the glycol compound (F) means a compound having two or more hydroxyl groups in a molecule thereof, and having 2 to 6,000 carbon atoms, preferably 2 to 2,000 carbon atoms, particularly preferably 2 to 400 carbon atoms.

Further, specific examples of the glycol compound (F) include a polyoxyalkylene glycol such as ethylene glycol, diethylene glycol, triethylene glycol, a polyethylene glycol having 8 or more carbon atoms, propylene glycol, polypropylene glycol, butylene glycol, polybutylene glycol, polyoxyethylene-polyoxypropylene glycol, polyoxytetramethylene-polyoxyethylene glycol, polyoxytetramethylene-polyoxypropylene glycol, or a polyethylene glycol-polypropylene glycol-polyethylene glycol block polymer; a bisphenol A derivative such as polyoxyethylene-bisphenol A ether, polyoxypropylene-bisphenol A ether, or polyoxyethylene-polyoxypropylene-bisphenol A ether; a multichain type polyoxyalkylene glycol such as polyglycerin, polyoxyethylene glycerin, polyoxypropylene glyceryl ether, polyoxyethylene-polyoxypropylene glyceryl ether, polyoxyethylene-polyoxypropylene trimethylolpropane, polyoxypropylene-diglyceryl ether, polyoxyethylene-polyoxypropylene pentaerythritol ether, or polyoxypropylene-sorbitol; and a multichain type polyoxyalkylene alkyl ether such as polyoxyethylene methyl glucoside or polyoxypropylene methyl glucoside. These compounds may be used singly or in combination of a plurality of kinds thereof.

Among these compounds, a polyoxyalkylene glycol is preferable, and ethylene glycol, diethylene glycol, triethylene glycol, a polyethylene glycol having 8 or more carbon atoms, polypropylene glycol, polybutylene glycol, and polyoxyethylene-polyoxypropylene glycol are more preferable.

Further, the glycol compound (F) is preferably a compound represented by the following general formula (1) because a more remarkable effect of the present invention is obtained.
{Chemical formula 1}

$$HO-(CH_2CH_2O)_n-H \qquad (1)$$

In the above formula (1), n is from 1 to 3,000, preferably from 1 to 1,000, more preferably from 1 to 200, and particularly preferably from 1 to 100.

In the present invention, among the compounds represented by the above formula (1), ethylene glycol, diethylene glycol, and polyethylene glycol having 8 or more carbon atoms are particularly preferable because a more remarkable effect of the present invention is obtained.

Note that, polyethylene glycol has preferably 6,000 or less carbon atoms, more preferably 2,000 or less carbon atoms, and particularly preferably 200 or less carbon atoms.

The content of the glycol compound (F) is preferably from 0.05 to 15 parts by weight, more preferably from 0.1 to 12 parts by weight, still more preferably from 0.2 to 9 parts by weight, and particularly preferably from 0.3 to 6 parts by weight with respect to 100 parts by weight of the nitrile rubber (A). When the content of the glycol compound (F) is within the above range, a phenomenon that an effect of improving solvent crack resistance cannot be obtained due to an excessively small content of the glycol compound (F) can be suppressed, and a phenomenon that a strength characteristic, gasoline permeability resistance, and cold resistance are lowered due to an excessively large content of the glycol compound (F) can be suppressed.

Note that, a use ratio between the glycol compound (F) and the coupling agent (E) (glycol compound (F):coupling agent (E)) is preferably from 1:0.001 to 1:100, more preferably from 1:0.01 to 1:50, and particularly preferably from 1:0.02 to 1:7 in terms of weight ratio because a more remarkable effect of the present invention is obtained.

(Method for Preparing Nitrile Rubber Composition)

A method for preparing the nitrile rubber composition used in the present invention is not particularly limited, but the nitrile rubber composition can be prepared by the following method. That is, first, a latex of the nitrile rubber (A) is prepared by the above method. Subsequently, by adding an aqueous dispersion of the inorganic filler (B) and an aqueous dispersion of the plasticizer (D) added as necessary to the latex of the nitrile rubber (A) under stirring, a latex composition is obtained. Then, the nitrile rubber composition can be prepared by coagulating the obtained latex composition, and washing the resulting product with water and drying as necessary. After coagulation or after washing with water and drying, the coupling agent (E) and the glycol compound (F) may be added as necessary.

A method for preparing an aqueous dispersion of the inorganic filler (B) is not particularly limited, but it is only required to prepare the aqueous dispersion of the inorganic filler (B) by adding the inorganic filler (B) while an aqueous medium is stirred strongly. An aqueous medium containing a dispersing agent, a surfactant, or the like, such as sodium polyacrylate, sodium tripolyphosphate, sodium hexametaphosphate, sodium pyrophosphate, sodium polymaleate, or a Na salt of a β-naphthalene sulfonic acid-formalin condensate in an amount of 0.1 to 10% by weight with respect to the inorganic filler (B) may be used. An anionic dispersing agent or surfactant is preferably contained. These compounds can be used singly or in combination of a plurality of kinds thereof. The solid content concentration of the aqueous dispersion of the inorganic filler (B) is preferably from 1 to 50% by weight, and more preferably from 2 to 40% by weight.

Further, in the present invention, in preparing the aqueous dispersion of the inorganic filler (B), the inorganic filler (B) may be dispersed in water using a wet grinding machine. By dispersing the inorganic filler (B) using a wet grinding machine, when the inorganic filler (B) is secondarily aggregated, secondary aggregation of the inorganic filler (B) can be eliminated, and an obtained cross-linked rubber product can have better gasoline permeability resistance. Examples of the wet grinding machine used in this case include a nasmizer (manufactured by Yoshida Kikai Co., Ltd.), a super wing mill DM-200 (manufactured by ESTEC Co. Ltd.), a starburst (manufactured by Sugino Machine Limited), and a star mill (manufactured by Ashizawa Finetech Ltd.). However, of course, another wet grinding machine can be used as long as being able to obtain a similar effect.

Further, when the plasticizer (D) is used, a method for preparing an aqueous dispersion of the plasticizer is not particularly limited. However, the aqueous dispersion is preferably prepared by adding the plasticizer (D) while an aqueous medium containing a surfactant in an amount of 0.5 to 10% by weight with respect to the plasticizer (D) is stirred strongly. Examples of such a surfactant include an anionic surfactant such as potassium rosinate, sodium lauryl sulfate, potassium oleate, or sodium dodecylbenzene sulfonate; a nonionic surfactant such as a polyoxyethylene alkyl ether, a polyoxyethylene alkyl ester, or a polyoxyethylene sorbitan alkyl ester; and a cationic surfactant such as didecyl dimethyl ammonium chloride or stearyl trimethyl ammonium chloride. Note that, the concentration of the plasticizer (D) in the aqueous dispersion is preferably from 5 to 70% by weight.

In addition, when the nitrile rubber composition used in the present invention further contains the vinyl chloride resin (C), it is only required to mix (latex-blend) the vinyl chloride resin (C) in a latex state or an aqueous dispersion state, manufactured by a conventionally known emulsion polymerization method or suspension polymerization method with a latex composition obtained by adding the inorganic filler (B) and the plasticizer (D) added as necessary to the above nitrile rubber (A).

Coagulation of the latex composition is not particularly limited, but a known method such as freeze coagulation, drying coagulation, coagulation by a water-soluble organic liquid, or salting out coagulation is applied. Among these methods, coagulation of the latex composition is preferably performed by adding the latex composition to an aqueous solution containing a coagulating agent and salting out the aqueous solution. Examples of the coagulating agent include calcium chloride, sodium chloride, calcium hydroxide, aluminum sulfate, and aluminum hydroxide. Further, the use amount of the coagulating agent is preferably from 0.5 to 150 parts by weight, and particularly preferably from 0.5 to 20 parts by weight with respect to 100 parts by weight of the nitrile rubber (A).

Incidentally, in a case where the nitrile rubber (A) contains the cationic monomer unit and/or the monomer unit capable of forming a cation (a3), when the latex composition is salted out, the pH of a coagulating agent aqueous solution is preferably controlled to an isoelectric point of the latex composition of the nitrile rubber (A) or lower by adding a dilute sulfuric acid aqueous solution or the like. By controlling the pH of the coagulating agent aqueous solution, the zeta potential of functional groups contained in the cationic monomer unit and/or the monomer unit capable of forming a cation (a3) contained in the nitrile rubber (A) is increased. Dispersibility of the inorganic filler (B) is thereby improved, and a crumb particle diameter obtained by coagulation can be large.

In general, the crumb particle diameter has a large influence on the dehydration degree in a vibration screen or a squeezer following coagulation and washing steps, a crumb recovery ratio, and dryness in a drying step. For example, when the crumb particle diameter is too small, in a vibration screen or the like, particles flow out through openings of the screen due to the small crumb particle diameter, or the dehydration degree is lowered due to insufficient bite of a polymer in a squeezer. Productivity is thereby deteriorated. Therefore, the average particle diameter of crumbs is preferably from 0.5 to 40 mm.

Methods for washing, dehydrating, and drying crumbs can be similar to a washing/dehydrating method and a drying method in a general method for manufacturing a rubber. As the washing/dehydrating method, it is only required to separate crumbs and water obtained by coagulation from each other using a mesh filter, a centrifuge, or the like, and then to wash the crumbs and dehydrate the crumbs using a squeezer or the like. Subsequently, by drying the crumbs using a band drier, a ventilation vertical dryer, a single-screw extruder, a twin-screw extruder, or the like until a desired moisture content is obtained, a rubber composition can be obtained. Coagulation and drying may be performed simultaneously in a twin-screw extruder.

Subsequently, by adding the coupling agent (E) and the glycol compound (F) as necessary to a rubber composition obtained by coagulating the latex composition and drying the latex composition as necessary, and kneading the resulting mixture using a kneader such as a roll or a Banbury mixer, a nitrile rubber composition can be prepared.

The Mooney viscosity ($ML_{1+4}$, 100° C.) of the nitrile rubber composition obtained in this manner is preferably from 5 to 300, and more preferably from 10 to 250.

Incidentally, in addition to the above methods, examples of the method for preparing the nitrile rubber composition include a method for adding the total amount or a part of all the components or one or more components of the inorganic filler (B), the vinyl chloride resin (C) added as necessary, the plasticizer (D) added as necessary, and the coupling agent (E) added as necessary to the latex of the nitrile rubber (A), then coagulating and drying the resulting product, adding the glycol compound (F) and the residual components as necessary, and kneading the resulting product with a kneader such as a roll or a Banbury mixer.

(Cross-Linking Agent)

The cross-linked rubber product of the present invention is obtained by cross-linking the above nitrile rubber composition (and subjecting the above nitrile rubber composition to secondary vulcanization). In cross-linking, usually, the nitrile rubber composition further contains a cross-linking agent (hereinafter, appropriately also referred to as "cross-linkable nitrile rubber composition").

The cross-linking agent is not particularly limited as long as being an agent usually used as a cross-linking agent of the nitrile rubber (A). Examples of a typical cross-linking agent include a sulfur-based cross-linking agent and an organic peroxide cross-linking agent for cross-linking unsaturated bonds of the nitrile rubber (A). These compounds may be used singly or in combination of a plurality of kinds thereof.

Examples of the sulfur-based cross-linking agent include sulfur such as powdered sulfur, flowers of sulfur, precipitated sulfur, colloidal sulfur, surface-treated sulfur, or insoluble sulfur; a sulfur-containing compound such as sulfur chloride, sulfur dichloride, morpholine disulfide, alkylphenol disulfide, dibenzothiazyl disulfide, N,N'-dithiobis(hexahydro-2H-azenopine-2), phosphorus-containing polysulfide, or polymer polysulfide; and a sulfur-donating compound such as tetramethyl thiuram disulfide, selenium dimethyl dithiocarbamate, or 2-(4'-morpholinodithio) benzothiazole. These compounds may be used singly or in combination of a plurality of kinds thereof.

Examples of the organic peroxide cross-linking agent include dicumyl peroxide, cumene hydroperoxide, t-butyl cumyl peroxide, p-menthane hydroperoxide, di-t-butyl peroxide, 1,3-bis(t-butylperoxyisopropyl) benzene, 1,4-bis(t-butylperoxyisopropyl) benzene, 1,1-di-t-butyl peroxy-3,3-trimethyl cyclohexane, 4,4-bis-(t-butyl-peroxy)-n-butyl valerate, 2,5-dimethyl-2,5-di-t-butyl peroxy hexane, 2,5-dimethyl-2,5-di-t-butyl peroxy hexyne-3, 1,1-di-t-butyl peroxy-3,5,5-trimethylcyclohexane, p-chlorobenzoyl peroxide, t-butyl peroxy isopropyl carbonate, and t-butyl peroxybenzoate. These compounds can be used singly or in combination of a plurality of kinds thereof.

The content of a cross-linking agent in the nitrile rubber composition used in the present invention is not particularly limited, but is preferably from 0.1 to 10 parts by weight, and more preferably from 0.2 to 5 parts by weight with respect to 100 parts by weight of the nitrile rubber (A).

When an organic peroxide cross-linking agent is used, as a cross-linking aid, for example, a polyfunctional monomer such as trimethylolpropane trimethacrylate, divinylbenzene, ethylene dimethacrylate, triallyl isocyanurate, or m-phenylene dimaleimide can be used together. The use amount of the cross-linking aid is not particularly limited, but is preferably from 0.5 to 20 parts by weight with respect to 100 parts by weight of the nitrile rubber (A).

When a sulfur-based cross-linking agent is used, a cross-linking aid such as flowers of zinc or stearic acid; and a cross-linking accelerator such as a guanidine-based, aldehyde-amine-based, aldehyde-ammonia-based, thiazole-based, sulfenamide-based, or thiourea-based cross-linking accelerator can be used together. The use amount of each of the cross-linking aid and the cross-linking accelerator is not particularly limited, but is preferably from 0.1 to 10 parts by weight with respect to 100 parts by weight of the nitrile rubber (A).

In addition, a compounding agent used for a general rubber may be blended as necessary to the nitrile rubber composition used in the present invention. Examples thereof include a cross-linking retarder, an anti-aging agent, a filler other than the inorganic filler (B), a slip agent, an adhesive, a lubricant, a processing aid, a flame retardant, a fungicide, an antistatic agent, and a coloring agent.

Examples of the anti-aging agent include phenol-based, amine-based, benzimidazole-based, and phosphoric acid-based anti-aging agents. Examples of the phenol-based anti-aging agent include 2,2'-methylenebis(4-methyl-6-t-butylphenol). Examples of the amine-based anti-aging agent include 4,4'-bis(a,a-dimethylbenzyl) diphenylamine and N-isopropyl-N'-phenyl-p-phenylenediamine. Examples of the benzimidazole-based anti-aging agent include 2-mercaptobenzimidazole. These compounds are used singly or in combination of two or more kinds thereof.

Examples of a filler other than the inorganic filler (B) include carbon black, silica, calcium carbonate, aluminum silicate, magnesium silicate, calcium silicate, magnesium oxide, a short fiber, and an $\alpha,\beta$-ethylenically unsaturated carboxylic acid metal salt such as zinc (meth)acrylate or magnesium (meth)acrylate. These fillers can be subjected to a coupling treatment with a silane coupling agent, a titanium coupling agent, or the like, and can be subjected to a surface modification treatment with a higher fatty acid or a metal salt thereof, a higher fatty acid derivative such as an ester or an amide, a surfactant, or the like.

Further, the nitrile rubber composition used in the present invention may contain a rubber or a resin other than the nitrile rubber (A) or the vinyl chloride resin (C) in a range not impairing an effect of the present invention. A rubber or a resin other than the nitrile rubber (A) or the vinyl chloride resin (C) is not particularly limited. However, examples thereof include an acrylic rubber, an ethylene-acrylic acid copolymer rubber, a fluorine rubber, a styrene-butadiene copolymer rubber, an ethylene-propylene copolymer rubber, an ethylene-propylene-diene terpolymer rubber, a natural rubber, a polyisoprene rubber, an ethylene-vinyl acetate copolymer rubber, an epichlorohydrin rubber, a urethane rubber, a chloroprene rubber, chlorosulfonated polyethylene, and chlorinated polyethylene. Incidentally, when a rubber or a resin other than the nitrile rubber (A) or the vinyl chloride resin (C) is blended, the blending amount thereof is preferably 100 parts by weight or less, more preferably 50 parts by weight or less, and particularly preferably 30 parts by weight or less with respect to 100 parts by weight of the nitrile rubber (A).

In the present invention, a preparation method for blending a cross-linking agent, a cross-linking aid, and another compounding agent to a nitrile rubber composition is not particularly limited. However, examples thereof include a method for adding a cross-linking agent, a cross-linking aid, and another compounding agent to the nitrile rubber composition obtained by the above preparation method, and kneading the resulting mixture with a kneader such as a roll or a Banbury mixer. Note that, a blending order is not particularly limited in this case. However, it is only required to mix components sufficiently which are resistant to reaction or decomposition by heat and then to mix components which easily react or decomposite by heat, such as a cross-linking agent or a cross-linking accelerator, at a temperature at which the reaction or decomposition will not occur in a short time.

The Mooney viscosity ($ML_{1+4}$, 100° C.) of the nitrile rubber composition used in the present invention is preferably from 5 to 300, and more preferably from 10 to 250.

(Cross-Linked Rubber Product)

The cross-linked rubber product of the present invention is obtained by cross-linking the above nitrile rubber composition. Further, in the present invention, the nitrile rubber composition is cross-linked (subjected to primary vulcanization) to obtain a primary cross-linked product, and then the primary cross-linked product is further subjected to secondary vulcanization. By performing secondary vulcanization, a cross-linked rubber product an inside of which is also sufficiently cross-linked can be obtained. As a result, the obtained cross-linked rubber product has particularly excellent compression set resistance.

When a nitrile rubber composition is subjected to primary vulcanization, forming is performed using a forming machine corresponding to the shape of a formed product (cross-linked rubber product) to be manufactured, such as an extruder, an injection forming machine, a compressor, or a roll. Subsequently, a cross-linking reaction in primary vulcanization is performed, and the shape of the cross-linked product is thereby fixed. When cross-linking in primary vulcanization is performed, cross-linking may be performed after preforming formation or simultaneously with formation. The forming temperature is usually from 10 to 200° C., and preferably from 25 to 120° C. Further, in primary vulcanization, the cross-linking temperature is usually from 100 to 200° C., and preferably from 130 to 190° C., and the cross-linking time is usually from one minute to 24 hours, and preferably from two minutes to one hour.

In secondary vulcanization, the cross-linking temperature is from 100 to 150° C., and preferably from 100 to 130° C., and the cross-linking time is from one hour to 24 hours. By performing secondary vulcanization under such a predetermined condition, the obtained cross-linked rubber product has particularly excellent compression set resistance.

Further, the cross-linked rubber product of the present invention has a compression set ratio (Cs) preferably of 50% or less, more preferably of 45% or less after being compressed under an atmosphere of 100° C. for 70 hours. Here, the compression set ratio of the cross-linked rubber product can be measured based on JIS K6262, for example.

The cross-linked rubber product of the present invention obtained in this manner is a cross-linked nitrile rubber product having excellent gasoline permeability resistance and excellent compression set resistance in addition to excellent oil resistance which is an intrinsic characteristic of a nitrile rubber.

As a result, the cross-linked rubber product of the present invention is suitable for use in the field of a fuel seal, and can reduce a load on the environment by reducing the transpiration amount of a fuel such as gasoline into the atmosphere.

The cross-linked rubber product of the present invention can be used suitably as a member for a fuel seal, such as a packing, a gasket, an O-ring, or an oil seal.

EXAMPLES

Hereinafter, the present invention will be described specifically by showing Examples and Comparative Examples. Hereinafter, "part" is based on a weight unless otherwise particularly specified. Note that, a test and evaluation were performed in the following manner.

Compression Set Ratio of Nitrile Rubber (A)

The compression set ratio of the nitrile rubber (A) was measured as a compression set ratio of the following cross-linked rubber product obtained by cross-linking a nitrile rubber composition containing the nitrile rubber (A), a cross-linking agent, and carbon black.

(Measurement of Compression Set Ratio of Nitrile Rubber A1)

A latex of a nitrile rubber obtained in Manufacturing Example A1 was poured into an aqueous solution containing calcium chloride (coagulating agent) in an amount of 4% by weight with respect to the amount of the nitrile rubber in the latex under stirring while the pH was adjusted by adding 10% dilute sulfuric acid appropriately such that the pH of the aqueous solution during coagulation was 2, and was coagulated to generate a crumb formed of the nitrile rubber.

Then, the resulting crumb was filtered and washed with water, and was then dried under reduced pressure at 60° C. Subsequently, 10 parts of MT carbon black ("Thermax (R) medium thermal carbon black N990", manufactured by CANCARB Co., Ltd.), and 5 parts of flowers of zinc and 1 part of stearic acid as a cross-linking aid were added with respect to 100 parts of the nitrile rubber in the dry crumb, and the resulting mixture was mixed using a Banbury mixer at 50° C. Then, this mixture was transferred to a roll, and 2.0 parts of morpholine disulfide (trade name "Vulnoc R", manufactured by Ouchi Shinko Chemical Industry Co., Ltd.) and 1.5 parts of tetramethylthiuram disulfide (trade name "Nocceler TT", manufactured by Ouchi Shinko Chemical Industry Co., Ltd.) as a cross-linking agent, and 1.5 parts of N-cyclohexyl-2-benzothiazolyl sulfenamide (trade name "Nocceler CZ", manufactured by Ouchi Shinko Chemical Industry Co., Ltd.) as a cross-linking accelerator were added and kneaded at 50° C. to prepare a cross-linkable nitrile rubber composition for measuring the compression set ratio of the nitrile rubber.

This cross-linkable nitrile rubber composition was subjected to primary vulcanization by pressing the cross-linkable nitrile rubber composition at a temperature of 170° C. for 25 minutes using a mold to obtain a cylindrical primarily cross-linked product having a diameter of 29 mm and a height of 12.7 mm. Subsequently, this primarily cross-linked product was further subjected to secondary vulcanization using a gear oven under conditions in Examples and Comparative Examples (temperature and time for secondary vulcanization indicated in Table 1) to obtain a cross-linked product of a nitrile rubber.

The obtained cross-linked rubber product was allowed to stand under an atmosphere of 100° C. for 70 hours while the pressed cross-linked product was compressed by 25% in accordance with JIS K6262. Thereafter, compression was released, and the compression set ratio (Cs) (%) of the nitrile rubber was measured. As this value is smaller, the compression set resistance is better. Note that, in Comparative Example 1, the compression set ratio of a primarily cross-linked product was measured without being subjected to secondary vulcanization.

(Measurement of Compression Set Ratio of Hydrogenated Nitrile Rubber A2)

A latex of a hydrogenated nitrile rubber obtained in Manufacturing Example A2 was poured into an aqueous solution containing calcium chloride (coagulating agent) in an amount of 4% by weight with respect to the amount of the nitrile rubber in the latex under stirring while the pH was adjusted by adding 10% dilute sulfuric acid appropriately such that the pH of the aqueous solution during coagulation was 2, and was coagulated to generate a crumb formed of the nitrile rubber.

Then, the resulting crumb was filtered and washed with water, and was then dried under reduced pressure at 60° C. Subsequently, 10 parts of MT carbon black ("Thermax (R) medium thermal carbon black N990", manufactured by CANCARB Co., Ltd.), and 5 parts of flowers of zinc and 1 part of stearic acid as a cross-linking aid were added with respect to 100 parts of the nitrile rubber in the dry crumb, and the resulting mixture was mixed using a Banbury mixer at 50° C. Then, this mixture was transferred to a roll, and 2.0 parts of morpholine disulfide (trade name "Vulnoc R", manufactured by Ouchi Shinko Chemical Industry Co., Ltd.) and 1.5 parts of tetramethylthiuram disulfide (trade name "Nocceler TT", manufactured by Ouchi Shinko Chemical Industry Co., Ltd.) as a cross-linking agent, and 1.5 parts of N-cyclohexyl-2-benzothiazolyl sulfenamide (trade name "Nocceler CZ", manufactured by Ouchi Shinko Chemical Industry Co., Ltd.) as a cross-linking accelerator were added and kneaded at 50° C. to prepare a cross-linkable nitrile rubber composition for measuring the compression set ratio of the nitrile rubber.

This cross-linkable nitrile rubber composition was subjected to primary vulcanization by pressing the cross-linkable nitrile rubber composition at a temperature of 170° C. for 25 minutes using a mold to obtain a cylindrical primarily cross-linked product having a diameter of 29 mm and a height of 12.7 mm. Subsequently, this primarily cross-linked product was further subjected to secondary vulcanization using a gear oven under conditions in Examples and Comparative Examples (temperature and time for secondary vulcanization indicated in Table 2) to obtain a cross-linked product of a nitrile rubber.

The obtained cross-linked rubber product was allowed to stand under an atmosphere of 100° C. for 70 hours while the pressed cross-linked product was compressed by 25% in accordance with JIS K6262. Thereafter, compression was released, and the compression set ratio (Cs) (%) of the nitrile rubber was measured. As this value is smaller, the compression set resistance is better. Note that, in Comparative Example 6, the compression set ratio of a primarily cross-linked product was measured without being subjected to secondary vulcanization.

Compression Set Resistance

The compression set ratio of a cross-linked rubber product containing the nitrile rubber (A) and the inorganic filler (B), obtained by the following method was measured, and was evaluated as compression set resistance.

(Measurement of Compression Set Ratio of Cross-Linked Rubber Product)

Each of cross-linkable nitrile rubber compositions obtained in Examples and Comparative Examples was subjected to primary vulcanization by pressing each of the cross-linkable nitrile rubber compositions at a temperature of 170° C. for 25 minutes using a mold to obtain a cylindrical primarily cross-linked product having a diameter of 29 mm and a height of 12.7 mm. Subsequently, this primarily cross-linked product was further subjected to secondary vulcanization using a gear oven under conditions in Examples and Comparative Examples (temperature and time for secondary vulcanization indicated in Table 1) to obtain a cross-linked product of a nitrile rubber (cross-linked rubber product).

The obtained cross-linked rubber product was allowed to stand under an atmosphere of 100° C. for 70 hours while being compressed by 25% in accordance with JIS K6262. Thereafter, compression was released, and the compression set ratio (Cs) (%) of the cross-linked rubber product was measured. As this value is smaller, the compression set resistance is better. Note that, in Comparative Example 1, the compression set ratio of a primarily cross-linked product was measured without being subjected to secondary vulcanization.

Manufacturing Example A1

(Manufacture of Latex of Nitrile Rubber (A1))

240 parts of water, 75.7 parts of acrylonitrile, 2.2 parts of 2-vinylpyridine, and 2.5 parts of sodium dodecylbenzene sulfonate (emulsifier) were put into a reactor, and the temperature was adjusted to 5° C. Subsequently, the pressure of a gas phase was reduced and degassed sufficiently, and then 22 parts of 1,3-butadiene, 0.06 parts of p-menthane hydroperoxide as a polymerization initiator, 0.02 parts of sodium ethylenediamine tetraacetate, 0.006 parts of ferrous sulfate (heptahydrate), 0.06 parts of sodium formaldehyde sulfoxylate, and 1 part of t-dodecylmercaptan as a chain transfer agent were added to initiate a reaction at a first stage in emulsion polymerization. After initiation of the reaction, when the polymerization conversion ratio with respect to the initial amount of the monomers reached 40% by weight and 60% by weight, 12 parts of 1,3-butadiene and 12 parts of 1,3-butadiene were added to the reactor to perform a polymerization reaction at a second stage and a polymerization reaction at a third stage, respectively. Thereafter, when the polymerization conversion ratio with respect to the initial amount of the total monomers reached 75% by weight, the polymerization reaction was terminated by adding 0.3 parts of hydroxylamine sulfate and 0.2 parts of potassium hydroxide. After the termination of the reaction, the contents of the reactor were heated to 70° C., and an unreacted monomer was recovered by steam distillation under reduced pressure to obtain a latex of the nitrile rubber (A1) (solid content 24% by weight).

A portion of the latex was extracted as a sample, was coagulated with a large amount of methanol, and was then filtered and dried to obtain the nitrile rubber (A1). When a content ratio of each of monomer units constituting the obtained nitrile rubber (A1) was measured by $^1$H-NMR using a FT-NMR apparatus (product name "JNM-ECA400WB" manufactured by JEOL Ltd.), the ratio of an acrylonitrile unit was 50% by weight, the ratio of a 1,3-butadiene unit was 48% by weight, and the ratio of a 2-vinylpyridine unit was 2% by weight. The nitrile rubber (A1) had a Mooney viscosity (polymer Mooney viscosity) of 73.

Manufacturing Example A2

(Manufacture of Hydrogenated Nitrile Rubber (A2))

Using a latex of the nitrile rubber (A1) obtained in a similar manner to Manufacturing Example 1, a palladium catalyst (solution obtained by mixing a 1% by weight palladium acetate acetone solution and ion-exchanged water in equal weights) was added to a reactor such that the content of palladium was 1000 ppm with respect to the weight of a dry rubber contained in the latex, and a hydrogenation reaction was performed at a hydrogen pressure of 3 MPa at a temperature of 50° C. for 6 hours to obtain a latex of the hydrogenated nitrile rubber (A2).

A portion of the latex was extracted as a sample, was coagulated with a large amount of methanol, and was then filtered and dried to obtain the nitrile rubber (A2). When a content ratio of each of monomer units constituting the obtained hydrogenated nitrile rubber (A2) was measured in a similar manner to Manufacturing Example 1, the ratio of an acrylonitrile monomer unit was 50% by weight, the total ratio of a 1,3-butadiene unit and a saturated butadiene unit was 48% by weight, and the ratio of a 2-vinylpyridine monomer unit was 2% by weight. The hydrogenated nitrile rubber (A2) had a Mooney viscosity (polymer Mooney viscosity) of 155 and an iodine value (measured in accordance with JIS K 6235) of 23.

Manufacturing Example 3

(Manufacture of Latex of Vinyl Chloride Resin)

120 parts of water, 0.8 parts of sodium lauryl sulfate, and 0.06 parts of potassium persulfate were put into a pressure-resistant reactor, and degassing under reduced pressure was repeated two times. Thereafter, 100 parts of vinyl chloride was put thereinto, and the resulting mixture was stirred and heated to perform emulsion polymerization at 47° C. After the polymerization conversion ratio reached 90%, the temperature was lowered to room temperature, and an unreacted monomer was removed. The concentration of the obtained vinyl chloride resin latex was 41% by weight. The average particle diameter of the vinyl chloride resin by centrifugal sedimentation turbidity method was 0.3 μm, the average polymerization degree measured by JIS K6721 was 1,300, and the glass transition temperature was 80° C.

Example 1

(Preparation of Nitrile Rubber Latex Composition)

100 parts of purified bentonite (trade name "Bengel HV", manufactured by Hojun Ltd., aspect ratio: 295) as the inorganic filler (B) was added to 1995 parts of distilled water, and stirred strongly in the presence of 5 parts of sodium polyacrylate to obtain an aqueous dispersion of the inorganic filler (B) having a solid content concentration of 5%. In addition, a 50% by weight aqueous emulsion of di(butoxyethoxyethyl) adipate (product name "Adeka Cizer RS-107", manufactured by ADEKA Co., plasticizer (D)) was prepared by mixing the plasticizer (D) and potassium oleate as an emulsifier in an amount of 2% by weight with respect to the plasticizer (D) under strong stirring.

Then, while the latex of the nitrile rubber (A1) obtained in Manufacturing Example 1 was stirred in a container, the aqueous dispersion of the inorganic filler (B) prepared in the above was added to the container and dispersed. Incidentally, the aqueous dispersion of the inorganic filler (B) was added such that the content of the inorganic filler (B) was 20 parts with respect to 100 parts of a solid content (the amount of the nitrile rubber) of the latex of the nitrile rubber (A1), and the solid content (nitrile rubber and the inorganic filler (B)) concentration was 15%.

Subsequently, 30 parts of the emulsion (the content of a plasticizer was 15 parts) containing di(butoxyethoxyethyl) adipate prepared in the above was added to the resulting dispersion in which the inorganic filler (B) was dispersed in the nitrile rubber (A1) with respect to 100 parts of the nitrile rubber (A1), and the resulting mixture was mixed and dispersed to obtain a nitrile rubber latex composition. The obtained nitrile rubber latex composition was poured into an aqueous solution containing calcium chloride (coagulating agent) in an amount of 4% by weight with respect to the amount of the nitrile rubber (A1) in the latex composition under stirring while the pH was adjusted by adding 10% dilute sulfuric acid appropriately such that the pH of the aqueous solution during coagulation was 2, and was coagulated to generate a crumb formed of a mixture of the nitrile rubber (A1), the inorganic filler (B), and the plasticizer (D).

(Preparation of Cross-Linkable Nitrile Rubber Composition)

Then, the resulting crumb was filtered and washed with water, and was then dried under reduced pressure at 60° C. Subsequently, 10 parts of MT carbon black ("Thermax (R) medium thermal carbon black N990", manufactured by CANCARB Co., Ltd.), and 5 parts of flowers of zinc and 1 part of stearic acid as a cross-linking aid were added to the above dry crumb with respect to 100 parts of the nitrile rubber (A1) in the crumb, and the resulting mixture was mixed using a Banbury mixer at 50° C. Then, this mixture was transferred to a roll, and 2.0 parts of morpholine disulfide (trade name "Vulnoc R", manufactured by Ouchi Shinko Chemical Industry Co., Ltd.) and 1.5 parts of tetramethylthiuram disulfide (trade name "Nocceler TT", manufactured by Ouchi Shinko Chemical Industry Co., Ltd.) as a cross-linking agent, and 1.5 parts of N-cyclohexyl-2-benzothiazolyl sulfenamide (trade name "Nocceler CZ", manufactured by Ouchi Shinko Chemical Industry Co., Ltd.) as a cross-linking accelerator were added and kneaded at 50° C. to prepare a cross-linkable nitrile rubber composition.

(Manufacture of Cross-Linked Rubber Product)

The obtained cross-linkable nitrile rubber composition was subjected to primary vulcanization by pressing the cross-linkable nitrile rubber composition at a temperature of 170° C. for 25 minutes using a mold to obtain a primarily cross-linked product. Subsequently, this primarily cross-linked product was further subjected to secondary vulcanization using a gear oven at a temperature of 100° C. for four hours to obtain a cross-linked rubber product. The compression set ratio of this cross-linked rubber product was measured. Table 1 indicates results.

Example 2

A cross-linked rubber product was obtained in a similar manner to Example 1 except that secondary vulcanization was performed at a temperature of 120° C. for four hours. The compression set ratio of this cross-linked rubber product was measured. Table 1 indicates results.

Example 3

A cross-linked rubber product was obtained in a similar manner to Example 1 except that secondary vulcanization was performed at a temperature of 120° C. for one hour. The compression set ratio of this cross-linked rubber product was measured. Table 1 indicates results.

Example 4

A cross-linked rubber product was obtained in a similar manner to Example 1 except that secondary vulcanization was performed at a temperature of 120° C. for two hours. The compression set ratio of this cross-linked rubber product was measured. Table 1 indicates results.

Example 5

A cross-linked rubber product was obtained in a similar manner to Example 1 except that secondary vulcanization was performed at a temperature of 120° C. for eight hours. The compression set ratio of this cross-linked rubber product was measured. Table 1 indicates results.

Example 6

A cross-linked rubber product was obtained in a similar manner to Example 1 except that secondary vulcanization was performed at a temperature of 120° C. for 24 hours. The compression set ratio of this cross-linked rubber product was measured. Table 1 indicates results.

Example 7

A nitrile rubber latex composition was prepared in a similar manner to Example 1 except that 45 parts of the vinyl chloride resin (C) was further mixed with respect to 100 parts of the nitrile rubber (A1) in addition to the nitrile rubber (A1), the inorganic filler (B), and the plasticizer (D), and the amount of di(butoxyethoxyethyl) adipate as the plasticizer (D) was changed to 45 parts in preparation of the nitrile rubber latex composition.

Subsequently, the nitrile rubber latex composition obtained in this manner was subjected to a coagulation operation in a similar manner to Example 1 to generate a crumb formed of a mixture of the nitrile rubber (A1), the inorganic filler (B), the plasticizer (D), and the vinyl chloride resin (C).

Then, the resulting crumb was filtered and washed with water, and was then dried under reduced pressure at 60° C. Subsequently, 2 parts of a stabilizer (trade name "ALCAMIZER 1", manufactured by Kyowa Chemical Industry Co., Ltd.) was added to the above dry crumb, and the resulting mixture was mixed using a Banbury mixer until the temperature of the mixture reached 180° C. Then, this mixture was transferred to a roll, and was cooled. Thereafter, 35 parts of MT carbon black ("Thermax (R) medium thermal carbon black N990", manufactured by CANCARB Co., Ltd.), and 7 parts of flowers of zinc and 1.5 parts of stearic acid as a cross-linking aid were added to the mixture with respect to 100 parts of the nitrile rubber (A1), and the resulting mixture was mixed again using a Banbury mixer at 50° C. Subsequently, this mixture was transferred to a roll, and 3.0 parts of morpholine disulfide (trade name "Vulnoc R", manufactured by Ouchi Shinko Chemical Industry Co., Ltd.) and 2.5 parts of tetramethylthiuram disulfide (trade name "Nocceler TT", manufactured by Ouchi Shinko Chemical Industry Co., Ltd.) as a cross-linking agent, and 2.5 parts of N-cyclohexyl-2-benzothiazolyl sulfenamide (trade name "Nocceler CZ", manufactured by Ouchi Shinko Chemical Industry Co., Ltd.) as a cross-linking accelerator were added and kneaded at 50° C. to prepare a cross-linkable nitrile rubber composition.

A cross-linked rubber product was obtained in a similar manner to Example 2 except that this cross-linkable nitrile rubber composition was used. The compression set ratio of this cross-linked rubber product was measured. Table 1 indicates results.

Example 8

A cross-linked rubber product was obtained in a similar manner to Example 7 except that 2 parts of β-(3,4-epoxycyclohexyl) ethyltrimethoxysilane (molecular weight 246.4) as the coupling agent (E) and 4 parts of polyethylene glycol (product name: polyethylene glycol 4,000, manufactured by Wako Pure Chemical Industries, Ltd., average molecular weight 3,000) as the glycol compound (F) were added in preparation of the cross-linkable nitrile rubber composition. The compression set ratio of this cross-linked rubber product was measured. Table 1 indicates results.

Example 9

A cross-linked rubber product was obtained in a similar manner to Example 5 except that a latex of the hydrogenated nitrile rubber (A2) was used in place of the latex of the nitrile rubber (A1) in preparation of the nitrile rubber latex composition. The compression set ratio of this cross-linked rubber product was measured. Table 2 indicates results.

Comparative Example 1

A cross-linked rubber product was obtained in a similar manner to Example 1 except that secondary vulcanization was not performed. The compression set ratio of this cross-linked rubber product was measured. Table 1 indicates results.

Comparative Example 2

A cross-linked rubber product was obtained in a similar manner to Example 1 except that secondary vulcanization was performed at a temperature of 90° C. for four hours. The compression set ratio of this cross-linked rubber product was measured. Table 1 indicates results.

Comparative Example 3

A cross-linked rubber product was obtained in a similar manner to Example 1 except that secondary vulcanization was performed at a temperature of 160° C. for four hours. The compression set ratio of this cross-linked rubber product was measured. Table 1 indicates results.

Comparative Example 4

A cross-linked rubber product was obtained in a similar manner to Example 1 except that secondary vulcanization was performed at a temperature of 120° C. for 0.5 hours. The compression set ratio of this cross-linked rubber product was measured. Table 1 indicates results.

Comparative Example 5

A cross-linked rubber product was obtained in a similar manner to Example 1 except that secondary vulcanization was performed at a temperature of 120° C. for 48 hours. The compression set ratio of this cross-linked rubber product was measured. Table 1 indicates results.

Comparative Example 6

A cross-linked rubber product was obtained in a similar manner to Example 9 except that secondary vulcanization was not performed. The compression set ratio of this cross-linked rubber product was measured. Table 2 indicates results.

TABLE 2

|  |  | Example 9 | Comparative Example 6 |
|---|---|---|---|
| Nitrile rubber |  |  |  |
| Composition of monomers | Acrylonitrile unit (% by weight) | 50 | 50 |
|  | 1,3-Butadiene unit (including a hydrogenated portion) (% by weight) | 48 | 48 |
|  | 2-Vinylpyridine unit (% by weight) | 2 | 2 |
|  | Iodine value | 23 | 23 |
| Compression set ratio of nitrile rubber (100° C. × 70 hr) Cs (%) |  | 15 | 38 |
| Blending of cross-linkable nitrile rubber composition (part) (only a part is indicated) |  |  |  |
| Nitrile rubber (A2) |  | 100 | 100 |
| Purified bentonite |  | 20 | 20 |
| Vinyl chloride resin |  | 0 | 0 |
| Di (butoxyethoxyethyl) adipate |  | 15 | 15 |
| Coupling agent[*1)] |  | 0 | 0 |
| Polyethylene glycol |  | 0 | 0 |
| Condition of secondary vulcanization | Temperature (° C.) | 120 | None |
|  | Time (hr) | 8 | None |
| Compression set ratio of cross-linked rubber product (100° C. × 70 hr) Cs (%) |  | 38 | 67 |

[*1)] β-(3,4-epoxycyclohexyl) ethyltrimethoxysilane is used as a coupling agent.

As indicated in Tables 1 and 2, a cross-linked rubber product for a fuel seal, obtained by cross-linking a nitrile rubber composition including a nitrile rubber (A) containing 25 to 80% by weight of α,β-ethylenically unsaturated nitrile monomer units (a1), 20 to 75% by weight of conjugated diene monomer units (a2), and 0 to 30% by weight of cationic monomer units and/or monomer units capable of forming a cation (a3), and having a compression set ratio of 20% or less after being compressed in an atmosphere of 100° C. for 70 hours, and an inorganic filler (B) having an aspect ratio of 30 to 2,000, the content of the inorganic filler (B) being from 1 to 200 parts by weight with respect to 100 parts by weight of the nitrile rubber (A), and obtained by subjecting the nitrile rubber composition to secondary vulcani-

TABLE 1

|  |  | Example |  |  |  |  |  |  |  | Comparative Example |  |  |  |  |
|---|---|---|---|---|---|---|---|---|---|---|---|---|---|---|
|  |  | 1 | 2 | 3 | 4 | 5 | 6 | 7 | 8 | 1 | 2 | 3 | 4 | 5 |
| Nitrile rubber |  |  |  |  |  |  |  |  |  |  |  |  |  |  |
| Composition of monomers | Acrylonitrile unit (% by weight) | 50 | 50 | 50 | 50 | 50 | 50 | 50 | 50 | 50 | 50 | 50 | 50 | 50 |
|  | 1,3-Butadiene unit (% by weight) | 48 | 48 | 48 | 48 | 48 | 48 | 48 | 48 | 48 | 48 | 48 | 48 | 48 |
|  | 2-Vinylpyridine unit (% by weight) | 2 | 2 | 2 | 2 | 2 | 2 | 2 | 2 | 2 | 2 | 2 | 2 | 2 |
| Compression set ratio of nitrile rubber (100° C. × 70 hr) Cs (%) |  | 12 | 10 | 11 | 12 | 8 | 11 | 10 | 10 | 28 | 26 | 24 | 26 | 23 |
| Blending of cross-linkable nitrile rubber composition (part) (only a part is indicated) |  |  |  |  |  |  |  |  |  |  |  |  |  |  |
| Nitrile rubber (A1) |  | 100 | 100 | 100 | 100 | 100 | 100 | 100 | 100 | 100 | 100 | 100 | 100 | 100 |
| Purified bentonite |  | 20 | 20 | 20 | 20 | 20 | 20 | 20 | 20 | 20 | 20 | 20 | 20 | 20 |
| Vinyl chloride resin |  | 0 | 0 | 0 | 0 | 0 | 0 | 45 | 45 | 0 | 0 | 0 | 0 | 0 |
| Di (butoxyethoxyethyl) adipate |  | 15 | 15 | 15 | 15 | 15 | 15 | 45 | 45 | 15 | 15 | 15 | 15 | 15 |
| Coupling agent [*1)] |  | 0 | 0 | 0 | 0 | 0 | 0 | 0 | 2 | 0 | 0 | 0 | 0 | 0 |
| Polyethylene glycol |  | 0 | 0 | 0 | 0 | 0 | 0 | 0 | 4 | 0 | 0 | 0 | 0 | 0 |
| Condition of secondary vulcanization | Temperature (° C.) | 100 | 120 | 120 | 120 | 120 | 120 | 120 | 120 | None | 90 | 160 | 120 | 120 |
|  | Time (hr) | 4 | 4 | 1 | 2 | 8 | 24 | 4 | 4 | None | 4 | 4 | 0.5 | 48 |
| Compression set ratio of cross-linked rubber product (100° C. × 70 hr) Cs (%) |  | 35 | 32 | 36 | 35 | 31 | 35 | 44 | 41 | 56 | 54 | 54 | 55 | 53 |

[*1)] β-(3,4-epoxycyclohexyl) ethyltrimethoxysilane is used as a coupling agent.

zation at 100 to 150° C. for 1 to 24 hours has excellent compression set resistance, and is suitable for a fuel seal (Examples 1 to 9).

On the other hand, when secondary vulcanization was not performed, a result of poor compression set resistance was obtained (Comparative Examples 1 and 6).

When the temperature in secondary vulcanization was too low (Comparative Example 2) or too high (Comparative Example 3), a result of poor compression set resistance was obtained.

When the time for secondary vulcanization was too short (Comparative Example 4) or too long (Comparative Example 5), a result of poor compression set resistance was obtained.

The invention claimed is:

1. A cross-linked rubber product for a fuel seal, obtained by cross-linking a nitrile rubber composition including:
a nitrile rubber (A) containing 25 to 80% by weight of α,β-ethylenically unsaturated nitrile monomer units (a1), 20 to 75% by weight of conjugated diene monomer units (a2), and 0 to 30% by weight of cationic monomer units and/or monomer units capable of forming a cation (a3), and having a compression set ratio of 20% or less after being compressed in an atmosphere of 100° C. for 70 hours; and
an inorganic filler (B) having an aspect ratio of 30 to 2,000,
a content of the inorganic filler (B) being from 1 to 200 parts by weight with respect to 100 parts by weight of the nitrile rubber (A), and
obtained by subjecting the nitrile rubber composition to secondary vulcanization at 100 to 150° C. for 1 to 24 hours.

2. The cross-linked rubber product according to claim 1, wherein the nitrile rubber (A) has been hydrogenated.

3. The cross-linked rubber product according to claim 1, wherein
the nitrile rubber composition further contains a vinyl chloride resin (C), and
a content of the vinyl chloride resin (C) is from 10 to 150 parts by weight with respect to 100 parts by weight of the nitrile rubber (A).

4. The cross-linked rubber product according to claim 1, wherein
the nitrile rubber composition further contains a plasticizer (D) having an SP value by a HOY method of 8 to 10.2 $(cal/cm^3)^{1/2}$, and
a content of the plasticizer (D) is from 3 to 100 parts by weight with respect to 100 parts by weight of the nitrile rubber (A).

5. The cross-linked rubber product according to claim 1, wherein
the nitrile rubber composition further contains a coupling agent (E) and a glycol compound (F),
a content of the coupling agent (E) is from 0.05 to 15 parts by weight with respect to 100 parts by weight of the nitrile rubber (A), and
a content of the glycol compound (F) is from 0.05 to 15 parts by weight with respect to 100parts by weight of the nitrile rubber (A).

* * * * *